Oct. 11, 1949.　　　R. L. E. REUTER　　　2,484,794
TURF-ANCHORING SPIKE FOR LAWN SPRINKLERS
Filed Nov. 9, 1946

INVENTOR.
René L. E. Reuter
BY
H. F. Johnston

UNITED STATES PATENT OFFICE 2,484,794

TURF-ANCHORING SPIKE FOR LAWN SPRINKLERS

René L. E. Reuter, Waterbury, Conn., assignor to Scovill Manufacturing Company, Waterbury, Conn., a corporation of Connecticut Application November 9, 1946, Serial No. 708,995

4 Claims. (Cl. 299—75)

This invention relates to lawn sprinklers and particularly to a turf engaging spike attached as a part of a lawn sprinkler unit.

An object of this invention is to provide a spike member that can be formed out of a sheet metal disc, and the disc conveniently secured to the base of a sprinkler unit.

A still further object is to design the spike disc of the above character and have the spike properly positioned in a biased manner relative to the base and in a plane common with the axis of the hose connection, which construction permits the spike to be forced into the turf in a biased manner and it can then be axially pulled out of the turf by merely pulling on the connecting hose without danger of tearing up the lawn.

With the foregoing and other objects in view, the invention consists of certain novel features of construction and arrangement of parts that will hereinafter be more fully described and claimed, and illustrated in the accompanying drawing in which—

Figure 1:
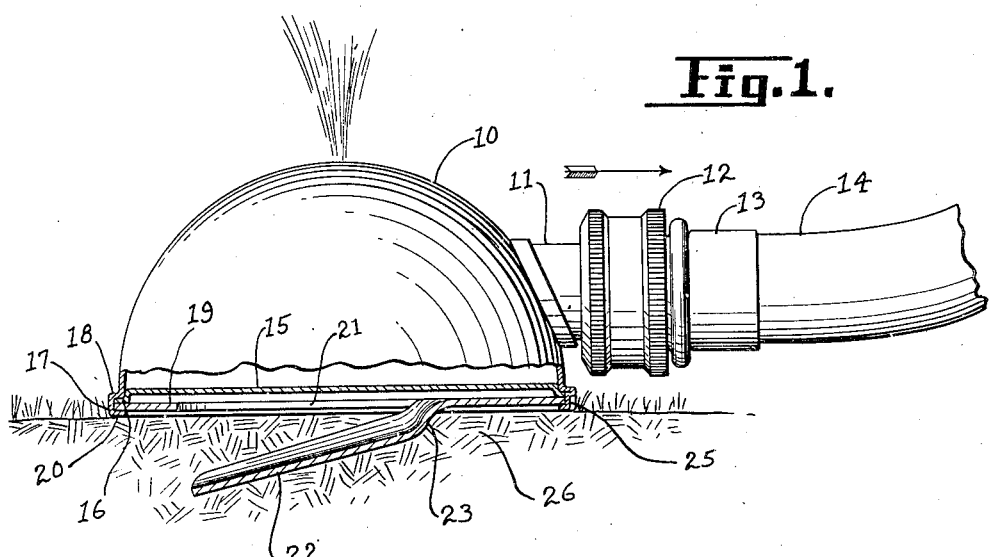
Fig. 1 is a side elevational view of a sprinkler unit as attached to the end of a hose and showing the lower part of the sprinkler in section to better show up the disc plate out of which the spike is formed.
Figure 4:
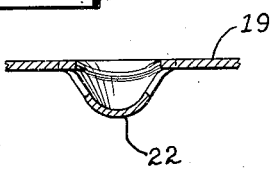
Fig. 4 is a fragmentary sectional view of the disc plate taken along the line 4—4 of Fig. 2, primarily to show up the cross sectional shape of the spike member.

It has been found from practice that when relatively light lawn sprinklers are placed upon the end of garden hose for the purpose of sprinkling lawns and the water pressure is turned on, there is always more or less of a torsional force set up in the hose that has a tendency to turn and upset the sprinkler on the end of the hose so that it will not lie flat upon the ground. The purpose of this invention is to apply a spike element to such relatively light sprinklers that will eliminate the above difficulties and assure that the sprinkler will maintain its proper position for sprinkling once the spike is properly biased into the lawn turf.

Referring now to the drawing in which like reference numerals designate like parts throughout the several views, the numeral 10 indicates a dome shaped housing shell made of relatively thin metal, and in this particular case shown as being substantially semi-spherical in shape though necessarily it need not be of such shape. Extending from the side wall of the housing shell 10 is a neck member 11 to which is swivelly connected a union nut 12 such as generally used in connecting the sprinkler to the male nipple 13 of a garden hose 14.

Referring to Fig. 1, and particularly to the sectionalized portion adjacent its base, it is to be noted that the housing 10 has its open end closed off by a closing base 15 that is provided with a circumferential downward offset flange 16 for the purpose of holding the disc in an assembled position. The lower and open end of the housing shell is formed with an enlarged terminal section 17 providing for a connecting shoulder 18 there between.

In accordance with the concept of this invention it is my purpose to provide a spike member that may be attached to lawn sprinklers in a relatively simple manner and to make the spike as cheaply as possible out of sheet material, preferably metal. With this in view there is employed a circular disc plate or member 19 stamped out of relatively heavy sheet metal and of a diametrical size to fit within the inner diameter of the enlarged section 17. The disc plate 19 is designed to be assembled as an integral part of the sprinkler unit. To this end the closing base 15 is first assembled into the open end of the housing shell 10 with the offset flange 16 resting up against the connecting shoulder 18. The disc plate 19 is next fitted into the enlarged section 17 resting against the flange 16, and the two parts 15 and 19 are permanently secured in place by spinning over or forming inwardly the lower end of the enlarged section 17 as at 20, all as clearly shown in Fig. 1.

Figure 2:
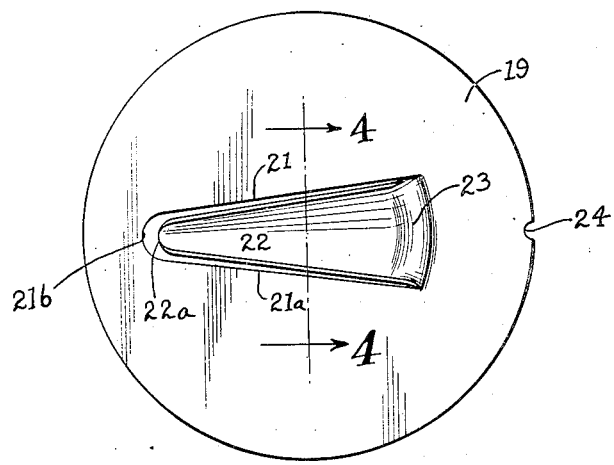
Fig. 2 is a top plane view of the disc plate, per se.
Figure 3:
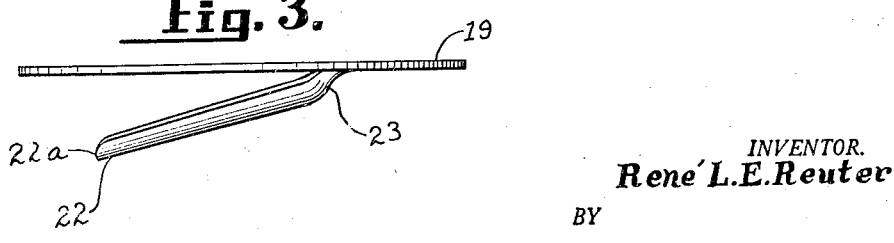
Fig. 3 is an end view of the same.

In forming a spike out of and as an integral part of said disc plate 19, at the center portion of said disc plate there is provided a shearing of two converging line cuts 21 and 21a joined together by an arcuate cut 21b, such as seen in Fig. 2, and the stock material between the shearing cuts 21, 21a and 21b is formed downwardly to provide a spike member 22. As best shown in Figs. 1 and 3 the axis of the spike member 22 is disposed at an acute angle relative to the adjacent face of the disc plate 19, and I have found that by having the spike member disposed about 15° to the face of the plate 19 is the most desirable angle for attaining the results desired. Furthermore, to give this spike member 22 additional strength it is made somewhat U-shaped or of arcuate form in transverse cross-section, the radius of curvature being relatively small at its leading end 22 and progressively increasing in size to its point of attachment where the spike member is integrally joined into this member by a relatively abrupt reversely bent portion as at 23. In making the spike member 22 of arcuate shape in cross-section for the purpose of giving it added strength, it is to be noted from the drawings that the arcuate shape carries substantially into the disc 19 proper through the reversely bent portion 23 to give it as much strength as possible at its point of attachment where the severest strains will result.

The positioning of the disc plate 19 relative to the housing 10 is such that the axis of the spike member 22 will lie substantially in a plane common with the axis of the neck member 11 where the sprinkler unit is joined on to the hose. To assure such positive positioning of the spike member 22 the disc plate 19 is provided with a notch 24 in the periphery thereof in alignment with the spike axis. Also there is provided in the enlarged section 17, in alignment with the neck member 11, an inwardly formed rib 25. In assembling the disc plate 19 in place, the notch 24 will be aligned and slipped over the rib 25 for the proper positioning of the disc plate 19 carrying the spike member relative to the sprinkler unit.

In the use of this particular spike member with the sprinkler unit, after the sprinkler has been attached to a garden hose and the sprinkler is placed upon the lawn, it will only be necessary to move the sprinkler unit across the surface of a lawn in alignment with and outwardly relative to the hose connection with enough pressure on the top of the sprinkler unit to force the spike member 22 in an inclined direction into the turf material as conventionally shown in Fig. 1 and represented by the numeral 26. The fact that the pointed end of the spike member is away from the point of attachment of the hose member assures that any time the hose member is pulled upon to move the sprinkler to another position or for storage purposes the spike member will axially pull out of the turf without tearing up the turf and in any way injuring the lawn. The fact that the spike member 22 is formed out of the stock of the plate 19, makes it, of course, no thicker than the plate material, and provides for a spike member in the form of a thin blade of arcuate shape for strength, and one that can be forced into the turf and removed therefrom and cut only a thin slit in the turf that will not injure or disturb the appearance of a lawn.

It is, of course, obvious that minor changes in details of construction and arrangement of parts may be made without departing from the scope of the present invention as set forth in the appended claims.

I claim:

1. A sprinkler unit of relatively light construction, a connecting neck member leading into said unit, a swivel nut carried by said neck member for joining said unit with a garden hose, a closure base for said unit, and a disc member of relatively thick sheet material superimposed over the outside of said closure base, said disc member having a spike element sheared out of a central portion and inclined at an acute angle to the face of said disc, said acute angle being no greater than 45 degrees or less than 15 degrees, the free and leading point of said spike element lying in a plane common with said neck member and being directed away from the point of attachment of said connecting neck member.

2. A sprinkler unit, as defined in claim 1, wherein the spike element is of arcuate shape in cross section.

3. A sprinkler unit, as defined in claim 1, wherein the spike element is of arcuate shape in cross section and progressively tapering outwardly from its leading free end to its point of attachment.

4. A sprinkler unit having a base portion adapted to be set upon a lawn, a detachable hose connecting coupling leading into said unit, a metal plate member of relatively heavy material secured to the base portion of said unit, a tapered spike element sheared and formed out from the mid-portion of said plate member and disposed at an acute angle relative to the adjacent face of said plate member, and means positioning said plate member so that the longitudinal axis of said spike element lies in a common plane with the axis of the hose connecting element and the free pointed end of said spike element being disposed away from the hose connection coupling, said acute angle of the spike element being in the order of 15 to 45 degrees whereby the spike element may be axially withdrawn from the lawn turf by a pull upon the hose.

RENÉ L. E. REUTER.

REFERENCES CITED

The following references are of record in the file of this patent:

UNITED STATES PATENTS

| Number | Name | Date |
| --- | --- | --- |
| 580,151 | Barnard | Apr. 6, 1897 |
| 1,087,580 | Hamill | Feb. 17, 1914 |
| 1,119,556 | Wesp | Dec. 1, 1914 |
| 2,421,104 | Wadsworth | May 27, 1947 |